(12) United States Patent  
Yamada (10) Patent No.: US 6,992,417 B1  
(45) Date of Patent: Jan. 31, 2006

(54) BOBBIN FOR ARMATURE OF ROTARY ELECTRICAL MACHINE (75) Inventor: Takashi Yamada, Mori-machi (JP)

(73) Assignee: Kabushiki Kaisha Moric, Mori-Machi (JP)

( * ) Notice: Subject to any disclaimer, the term of this patent is extended or adjusted under 35 U.S.C. 154(b) by 0 days.

(21) Appl. No.: 10/710,383

(22) Filed: Jul. 6, 2004

(30) Foreign Application Priority Data

Jul. 11, 2003 (JP) .............................. 2003-273377

(51) Int. Cl.  
H02K 1/00 (2006.01)

(52) U.S. Cl. ..................................... 310/194

(58) Field of Classification Search ................ 310/194, 310/71, 258, 259, 316, 217, 218, 216  
See application file for complete search history.

(56) References Cited

U.S. PATENT DOCUMENTS 4,818,911 A * 4/1989 Taguchi et al. ............. 310/259  
5,698,923 A * 12/1997 Scherzinger et al. ........ 310/194  
6,127,760 A * 10/2000 Nagasaki et al. ........... 310/254

* cited by examiner

Primary Examiner—Darren Schuberg  
Assistant Examiner—Nguyen Hanh  
(74) Attorney, Agent, or Firm—Ernest A Beutler (57) ABSTRACT An insulator for an armature wherein the insulator is formed with a slot at one end of the teeth on which the coils are wound to trap the end coil to prevent its axial slippage as the coil end is drawn out.

7 Claims, 11 Drawing Sheets

BOBBIN FOR ARMATURE OF ROTARY ELECTRICAL MACHINE

BACKGROUND OF INVENTION

This invention relates to an insulating bobbin for a rotary electrical machine and more particularly to a bobbin construction that facilitates the error free winding of electrical coils around the insulated pole teeth of an armature.

As is well known the armature of a rotary electric machine can comprise either a rotor or stator. It generally has a yoke comprising a ring shaped portion from which a plurality of circumferentially spaced magnetic pole teeth extend in a radial direction. The magnet pole teeth made of magnetic material such as iron are covered with insulating bobbins around which a coil of wire is wound. These bobbins are generally comprised of mating halves that are inserted from opposite sides of the yoke to substantially cover the yoke teeth. The wound coils cooperate with permanent magnets disposed in facing relationship to the magnet pole tooth.

As shown in co-pending application Ser. No. 10/709,919, entitled "INSULATOR FOR ARMATURE", filed Jun. 5, 2004, in the name of the inventor hereof and another and assigned to the assignee hereof there are disclosed insulating bobbins for an armature that facilitate assembly. This application represents an improvement thereon that avoids a potential problem in the winding of the coils that may best be understood by reference to FIGS. 1–6, hereof.

Figure 1:
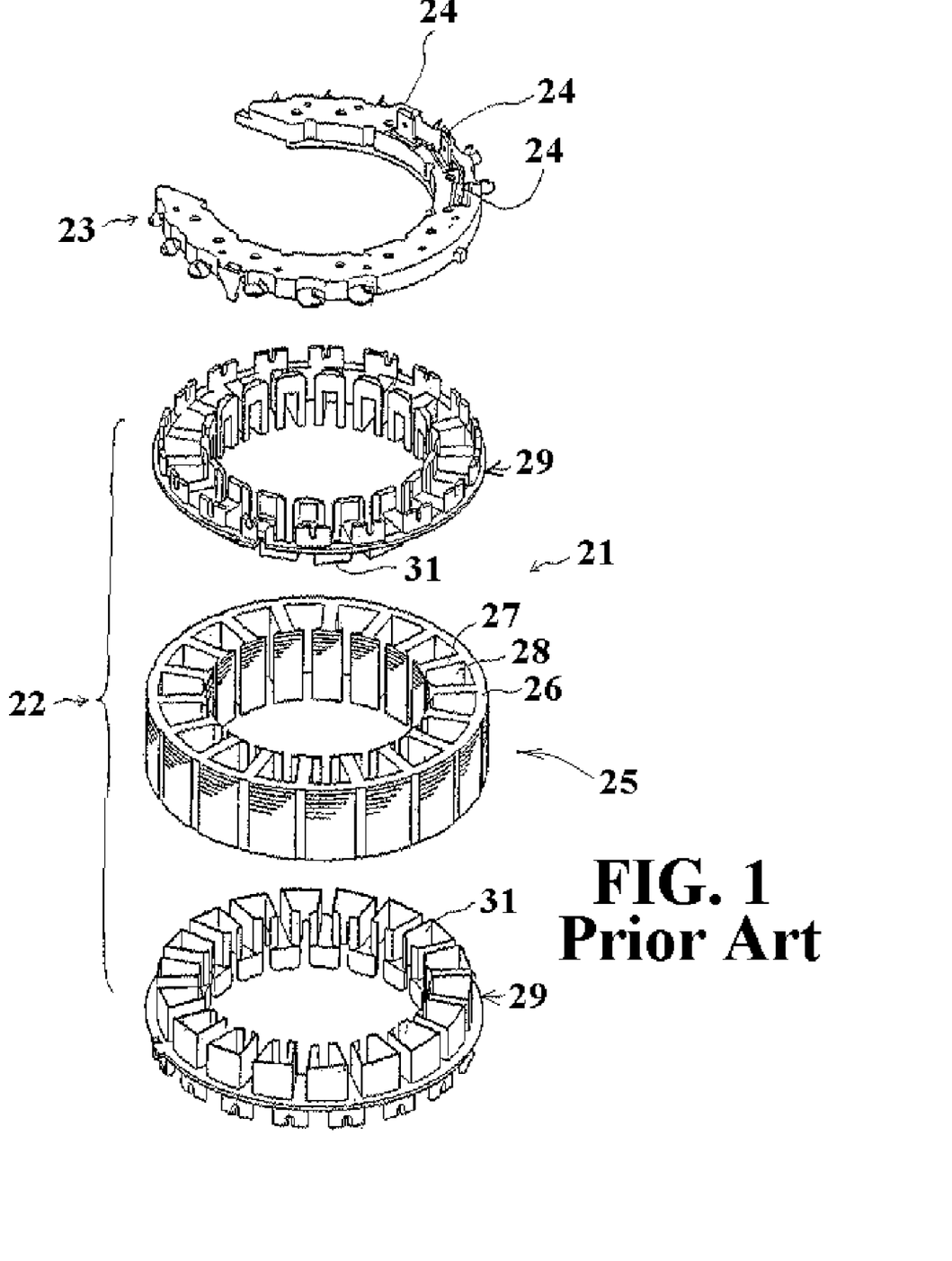
FIG. 1 is an exploded perspective view of a prior art type of armature.

Referring first primarily to FIG. 1, this is an exploded perspective view of the prior art armature, discussed generally above. The armature is indicated generally at 21. As illustrated, the armature 21 is provided for a three-phase motor and as an example only is part of a stator 22 with a wiring base 23 attached to one axial end (top end side in this figure) of the stator 22, through which the wound coils are interconnected in a manner as described in the co-pending application. The wiring base 23 is provided with three-phase (U, V, W) output terminals 24.

As shown in FIG. 1, the stator 22 is made up of a stator yoke or core 25 made as a body of laminated thin ferromagnetic plates. The stator yoke 25 is formed into a ring shape so as to surround the periphery of a rotor (not shown) and has integral, plural magnetic pole teeth 27 projecting radially inward. Slots 28 are formed between adjacent pairs of the magnetic pole teeth 27.

Generally like configured insulating bobbin halves, each indicated generally by the reference numeral 29, are telescopically fitted over opposite sides of the core 25. Each bobbin half 29 is formed with insert portions or lugs 31 formed in the same number as the slots 28 integrally with the side of the ring-like bobbins 29 facing the yoke or core 25. These lugs 31 are inserted into the slots 28, so that both bobbins 29 are secured and held to the stator yoke 25.

These upper and lower bobbins 29 cover each magnetic pole tooth 27 on the stator yoke 25 and a coil wire is wound up and down through the slots 28 present on both sides of each magnetic pole tooth 27, to form a plurality of circumferentially spaced coils, as will be seen later by reference to FIG. 4.

Figure 2:
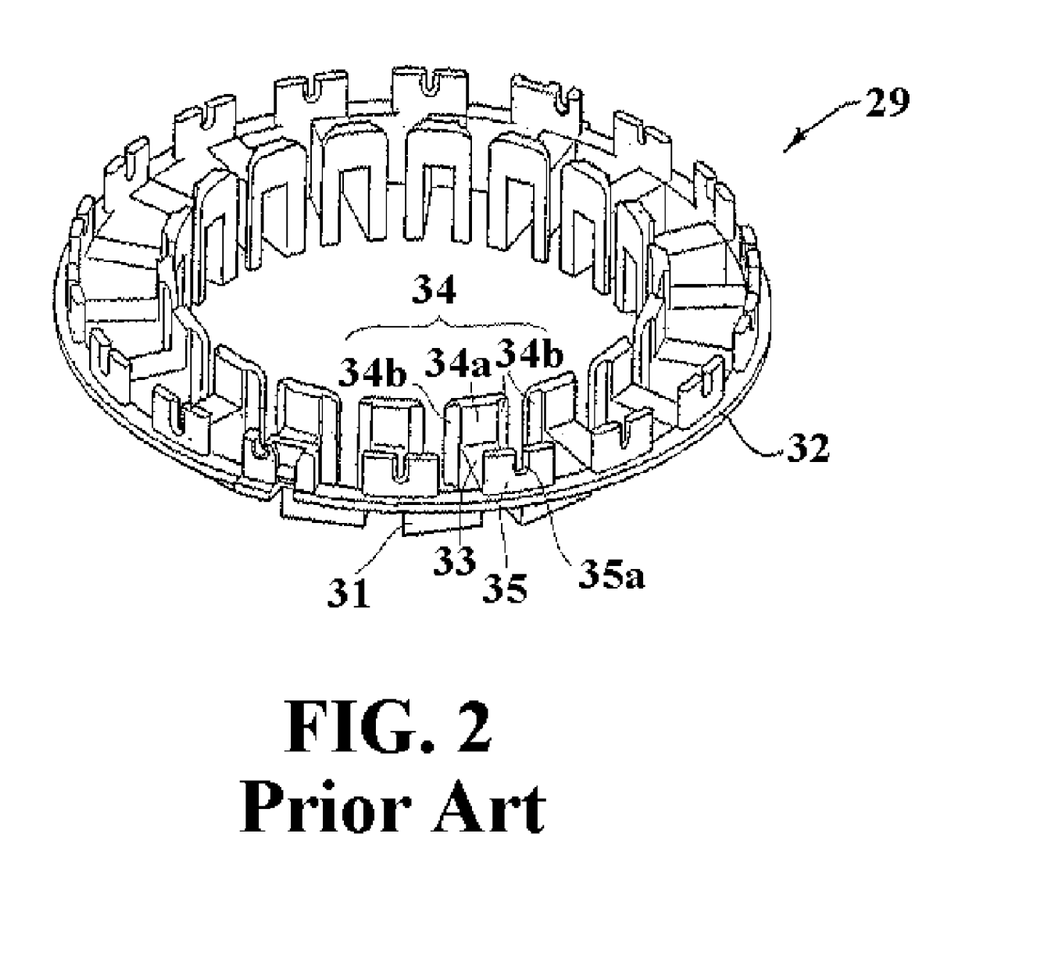
FIG. 2 is a perspective view of one of the prior art insulating bobbin halves.
Figure 3:
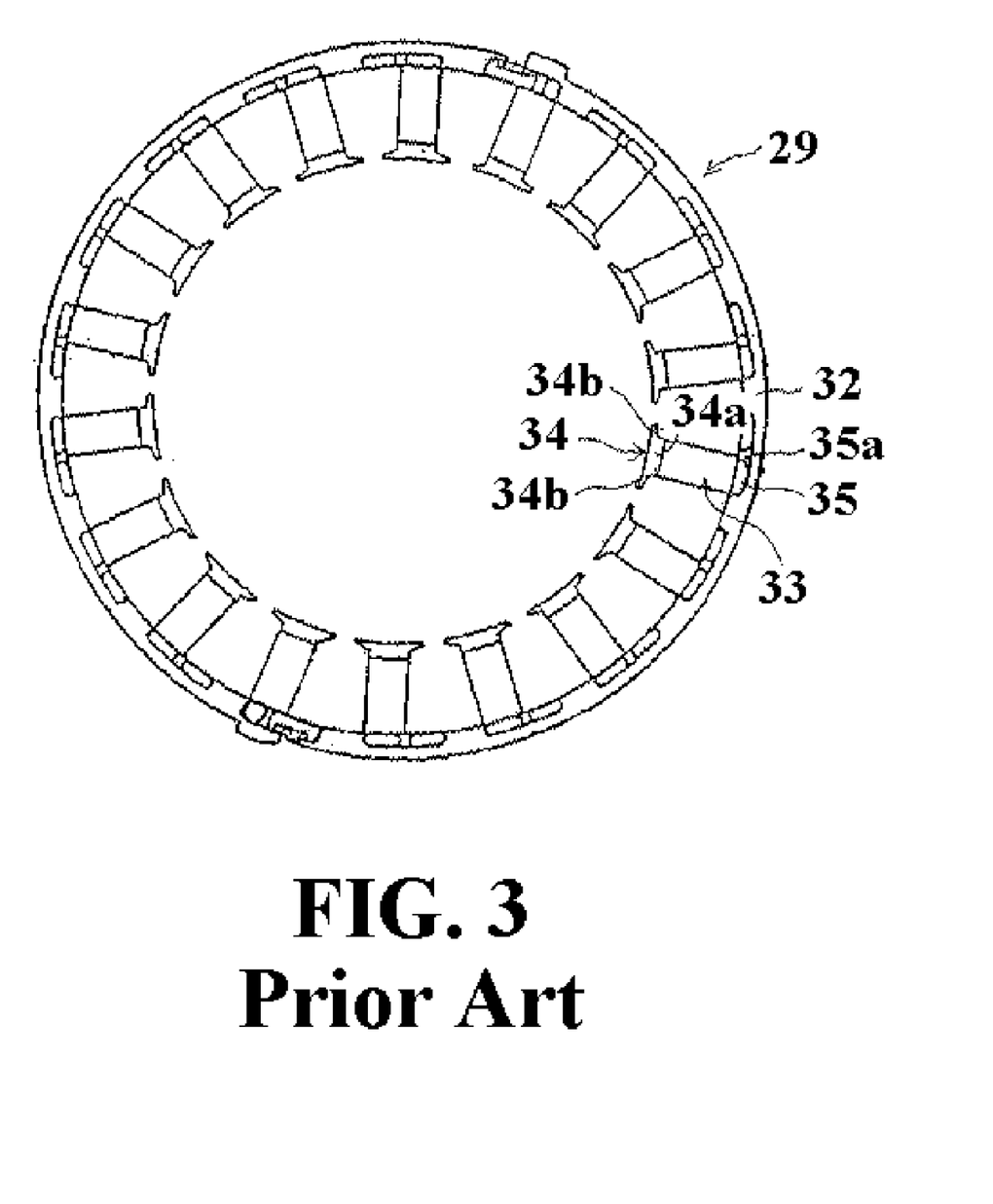
FIG. 3 is a top plan view of the one insulating bobbin half.

As best seen in FIGS. 2 and 3, each bobbin half 29 is of a ring shape made as a single body from a resin material and comprises a ring shape base portion 32 which covers an axial outer surface of the stator yoke 25, a coil winding portion 33 which covers each magnetic pole tooth 27 (FIG. 1) projecting inward from the base 32, and an end flange 34 continued from the coil winding portion 33, which covers a tip end (inner end) of each magnetic pole tooth 27.

Each flange 34 has a thick wall portion 34a formed above from the top surface of the coil winding portion 33 and side lugs 34b on both side of the thick wall portion 34a. These portions 34a and 34b locate and confine one end of the coil windings.

A protruding wall 35 is provided on the radially outer surface of the insulator base portion 32 on a root side of the coil winding portion 33. The protruding wall 35 is provided as a stopper or locator for the other radial end of the wound coil. It also is designed to catch and retain a bridge line for interconnecting one coil and another other coil on which a common coil wire is wound as well as to receive a coil end (upper surface portion of the coil winding portion 33 of each magnetic pole tooth) of each coil. As shown as an example shows the projecting walls 35 having slits 35a through which a winding end of the coil passes.

Figure 4:
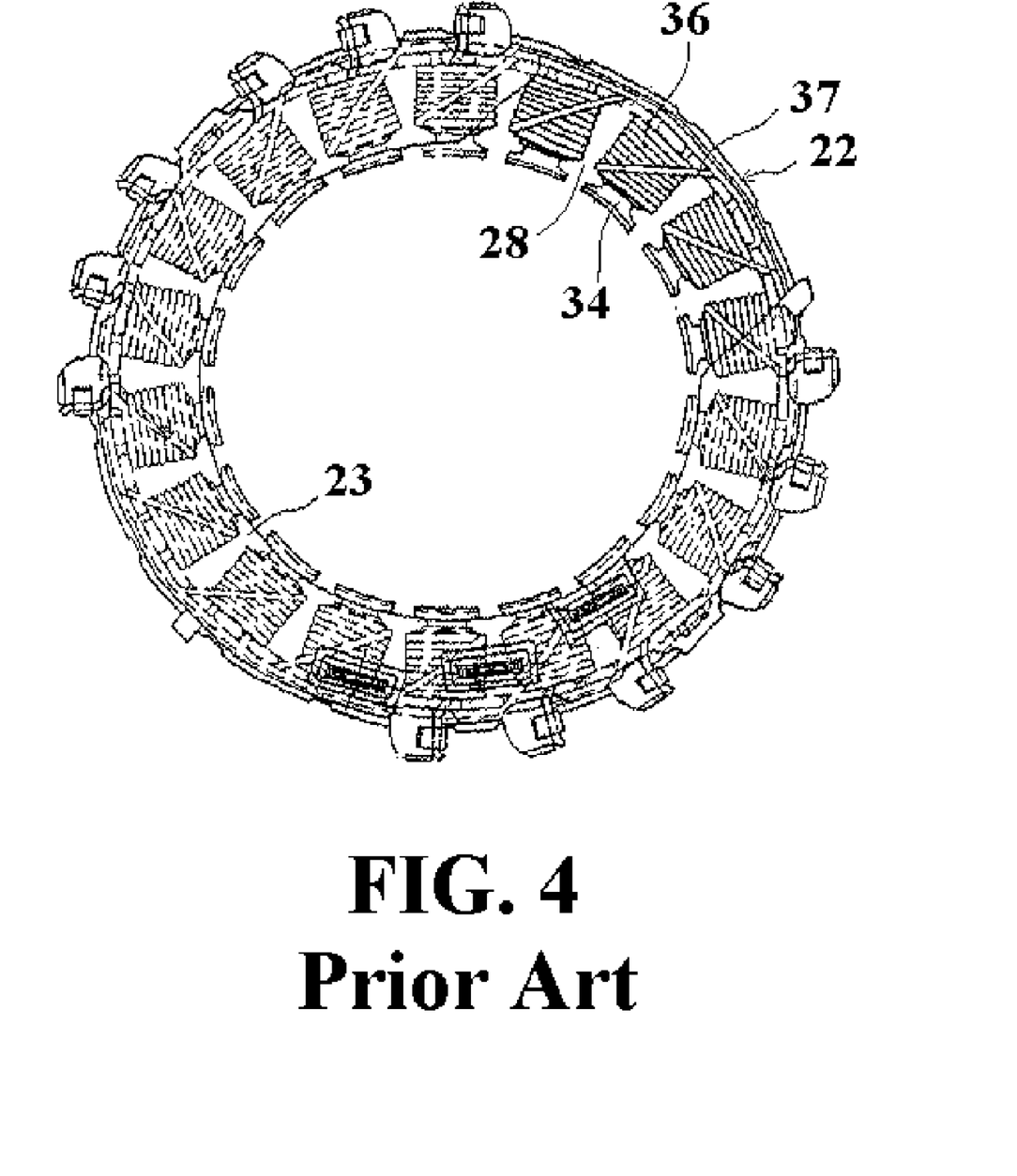
FIG. 4 is a top plan view of a wound prior art armature.

Referring now to FIG. 4, this illustrates the stator 22 having the wound and interconnected coils, indicated at 35. An end 36 of each coil 35 is drawn back to the root side of each magnetic pole tooth from the tip end side (inner end side) through a slit 35a so that it turns to a start of the coil winding for another coil 35 or is drawn out to be connected with the wiring base 23.

In addition to describing the prior art, the foregoing description relates also to the several embodiments of this invention, except as hereinafter described by reference to the several embodiments of the invention. The problems with the prior art and solved with this invention can be best understood by reference to FIGS. 5 and 6 which illustrate detailed views of the magnetic pole tooth of the bobbin 29. The coil 35 is formed around the bobbin coil winding portion 33. The end of the coil winding 36 for the coil 35 is drawn back to the root side of the magnetic pole tooth from the tip end side or the backside of the flange 34. It is possible, therefore, that this action could cause the coil winding end 36 to slide off over the coil 35 to its middle part as shown with a dotted line in the figure. This would result in a protrusion at the middle part of the coil. This causes a coil winding nozzle (not shown) to touch the displaced end of the coil winding 36 (shown by a dotted line) when the nozzle is inserted into the slot 28 to wind a wire on an adjacent coil, and damage the wire coating.

Therefore it is a principal object of this invention to provide a bobbin for an armature of a rotary electric machine which prevents a coil wire end from sliding off from the tip end side of the magnetic pole tooth to the root side and become damaged upon the winding of the next coil.

SUMMARY OF INVENTION

An insulator for an armature core of a rotating electrical machine. The core has an annular section from which a plurality of circumferentially spaced teeth extend in a radial direction and define slots therebetween. The insulator is comprised of a cylindrical portion having a plurality of circumferentially spaced tooth covering portions extend in radial directions. Each of the tooth covering portions has a generally channel shape in radial cross sections for covering a radial face of a respective of the core teeth and at least a portion of the side surfaces of the tooth facing the slots between adjacent of the teeth. The radially outermost part of each of the tooth covering portions is formed with a axially extending flange to form an abutment against which a coil winding is abuttingly engaged. A slot like recess to trap the wire of the coil winding end is formed contiguous to the axially extending flange to prevent it from slipping along the generally channel shape portion in a radial direction.

DETAILED DESCRIPTION

In describing the various embodiments of the invention, the same reference numerals applied in describing the prior art constructions will be applied because the basic structure of all embodiments is the same as the prior art. The difference, as will become apparent shortly is in the formation of the thick wall portion 34a of the bobbin tooth end flanges 34. In each embodiment illustrated a form of cut is formed in these thick wall portions 34a to trap and retain the end winding 37 of the wire of the coils 36. However for the sake of completeness the entire structure will be described again first by reference to FIGS. 7–10. Later the specific embodiments will be described in detail by reference to FIGS. 10–15. Finally a complete machine will be described by reference to FIGS. 16–19.

Referring now in detail, first primarily to FIGS. 7–10, the armature 21 is provided for by way of example a three-phase motor and consists of a stator 22 and a wiring base 23 attached to one axial end of the stator 22, through which the coils 36, not shown in these figures are interconnected. The wiring base 23 is provided with three-phase (U, V, W) output terminals 24 wired as will be described later by reference to FIGS. 16 and 17.

Figure 7:
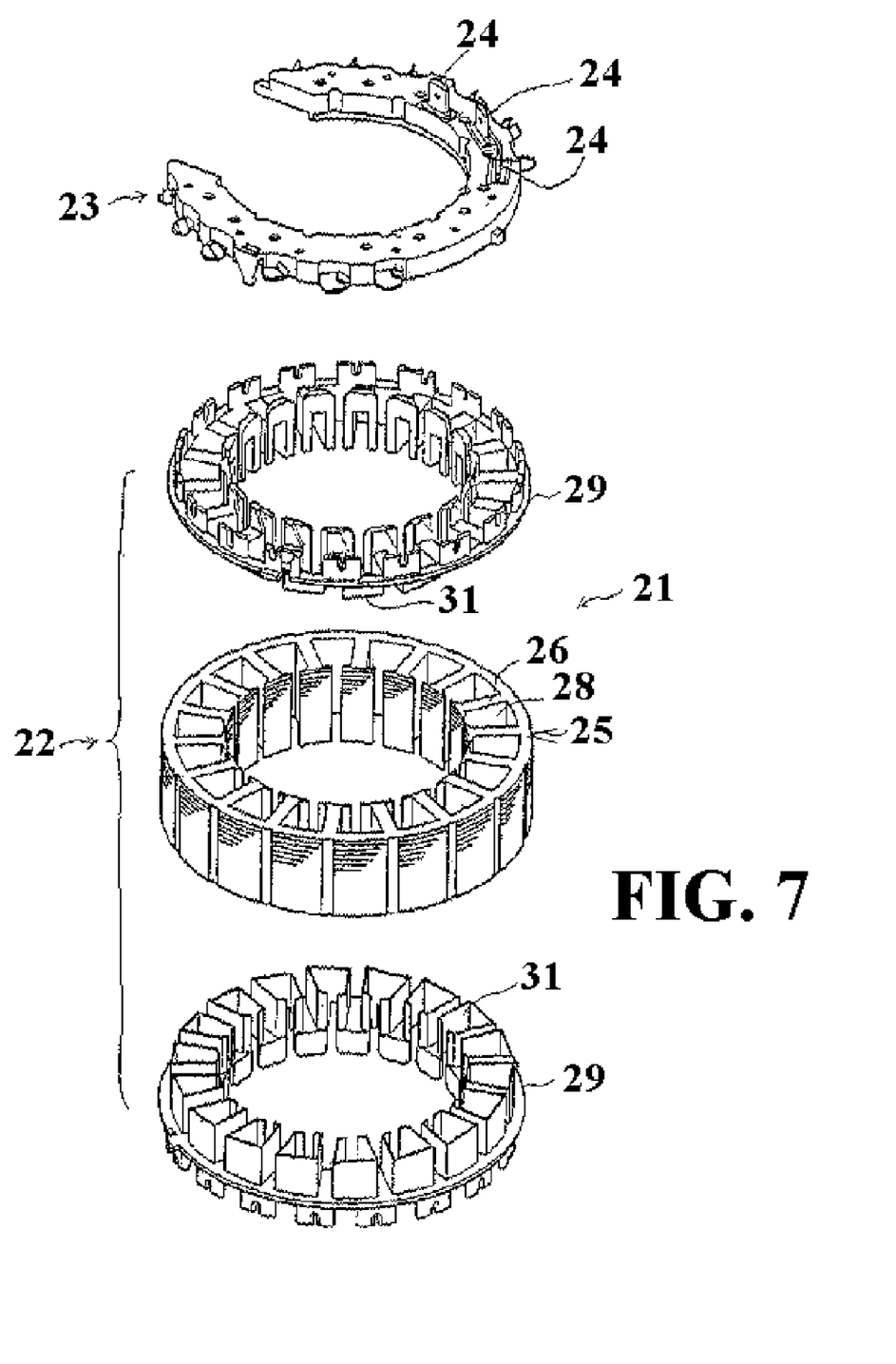
FIG. 7 is an exploded perspective view, in part similar to FIG. 1, but shows a first embodiment of the invention.

As shown in FIG. 7, the stator 22 is made up of a stator yoke, indicated generally at 25 made as a body of laminated thin ferromagnetic plates. The stator yoke 25 has a ring shape portion 26 that surrounds a rotor (not shown in these figures but which will be described later by reference to FIGS. 18 and 19) and from which circumferentially spaced, integral, plural magnetic pole teeth 27 project radially inward.

As shown in FIG. 7, the stator 22 is made up of a stator yoke or core 25 made as a body of laminated thin ferromagnetic plates. The stator yoke 25 is formed into a ring shape so as to surround the periphery of a rotor (not shown) and has integral, plural magnetic pole teeth 27 projecting radially inward. Slots 28 are formed between adjacent pairs of the magnetic pole teeth 27.

Generally like configured insulating bobbin halves, each indicated generally by the reference numeral 29, are telescopically fitted over opposite sides of the core 25. Each bobbin half 29 is formed with insert portions or lugs 31 formed in the same number as the slots 28 integrally with the side of the ring-like bobbins 29 facing the yoke or core 25. These lugs 31 are inserted into the slots 28, so that both bobbins 29 are secured and held to the stator yoke 25.

These upper and lower bobbins 29 cover each magnetic pole tooth 27 on the stator yoke 25 and a coil wire is wound up and down through the slots 28 present on both sides of each magnetic pole tooth 27, to form a plurality of circumferentially spaced coils, wired as will be described later by reference to FIGS. 16 and 17.

Figure 8:
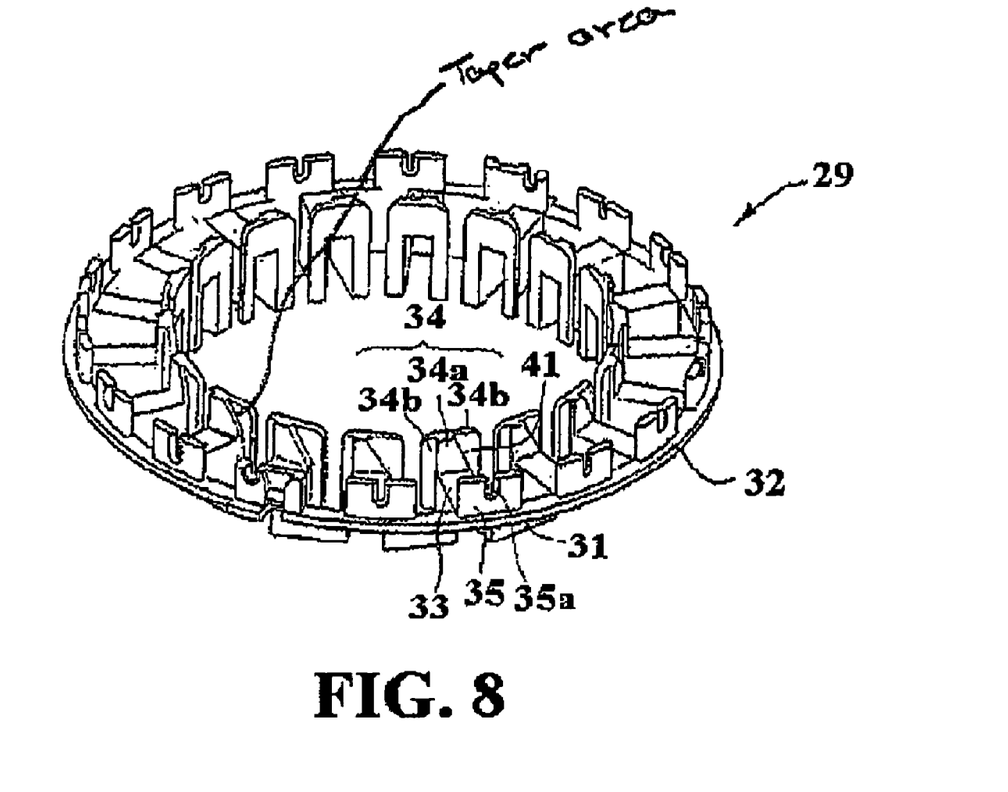
FIG. 8 is a perspective view in part similar to FIG. 2 but showing one of the insulating bobbin halves of the first embodiment.
Figure 9:
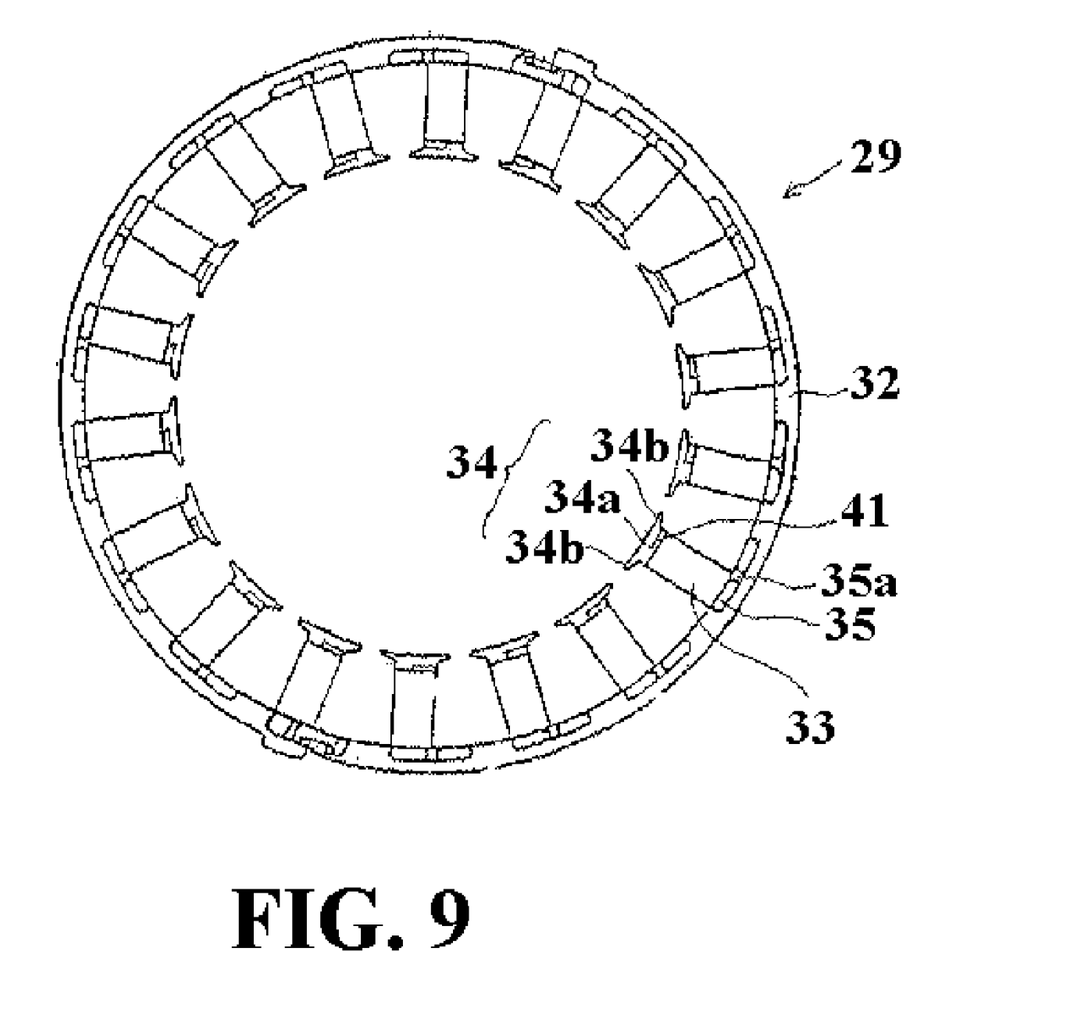
FIG. 9 is a top plan view, in part similar to FIG. 3 but showing the one insulating bobbin half of the first embodiment.
Figure 10:
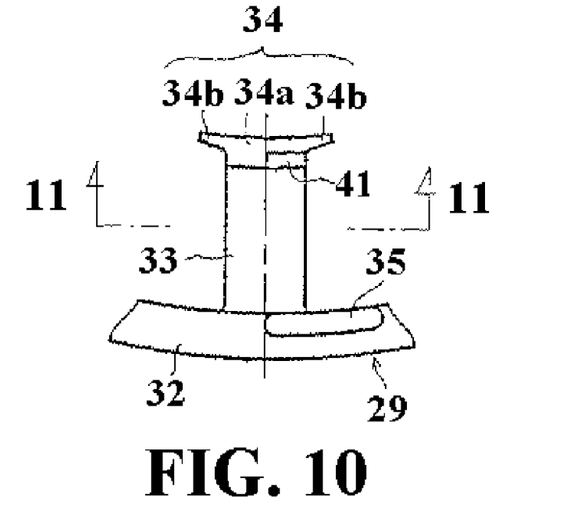
FIG. 10 is an enlarged top plan view, in part similar to FIG. 4 but showing one of the armature teeth of the first embodiment.
Figure 11:
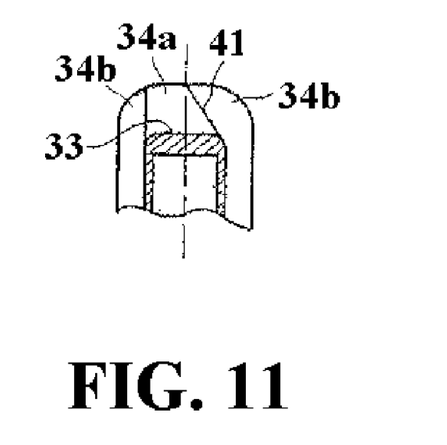
FIG. 11 is a cross sectional view taken along the line 11—11 of FIG. 10.

As best seen in FIGS. 8 and 9, each bobbin half 29 is of a ring shape made as a single body from a resin material and comprises a ring shape base portion 32 which covers an axial outer surface of the stator yoke 25, a coil winding portion 33 which covers each magnetic pole tooth 27 (FIG. 7) projecting inward from the base 32, and an end flange 34 continued from the roil winding portion 33, which covers a tip end (inner end) of each magnetic pole tooth 27.

Each flange 34 has a thick wall portion 34a formed above from the top surface of the coil winding portion 33 and side lugs 34b on both side of the thick wall portion 34a. These portions 34a and 34b locate and confine one end of the coil windings.

A protruding wall 35 is provided on the radially outer surface of the insulator base portion 32 on a root side of the coil winding portion 33. The protruding wall 35 is provided as a stopper or locator for the other radial end of the wound coil. It also is designed to catch and retain a bridge line for interconnecting one coil and another other coil on which a common coil wire is wound as well as to receive a coil end (upper surface portion of the coil winding portion 33 of each magnetic pole tooth) of each coil. As shown as an example shows the projecting walls 35 having slits 35a through which a winding end of the coil passes.

In accordance with the invention and to avoid the potential disadvantages described previously, a recess 41 is formed on the thick wall portion 34a on the backside of the flange 34. The recess 41 in the first embodiment of FIGS. 7–11 has an upwardly slope from the upper edge of the side surface of the coil winding portion 33 toward the center of the magnetic pole tooth although other shapes are possible and several variations will be described shortly by reference to FIGS. 12–15. This recess 41 is configured to trap and retain the winding end 37 of the coils 36 to prevent slippage away from the thick wall portion 34a.

Figure 12:
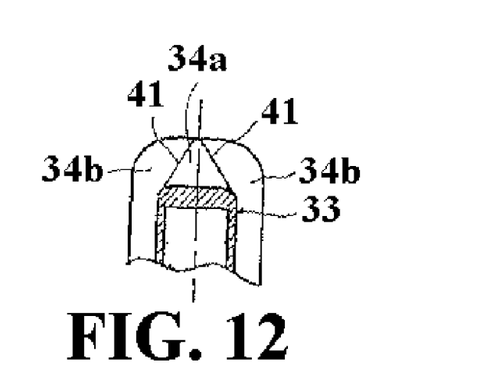
FIG. 12 is a cross sectional view in part similar to FIG. 11, but shows a second embodiment.
Figure 13:
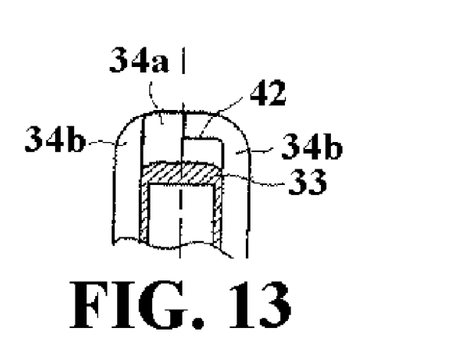
FIG. 13 is a cross sectional view in part similar to FIGS. 11 and 12, but shows a third embodiment.

FIG. 12 shows an embodiment like that of the previously described embodiment but a pair of recesses 41 are formed on opposite sides of the thick wall portion 34a FIG. 13 does not utilize a slope but rather is formed with a notch like recess 42 in a vertical midsection of the thick wall portion 34a toward an approximately center in the width direction of the magnetic pole tooth.

Figure 14:
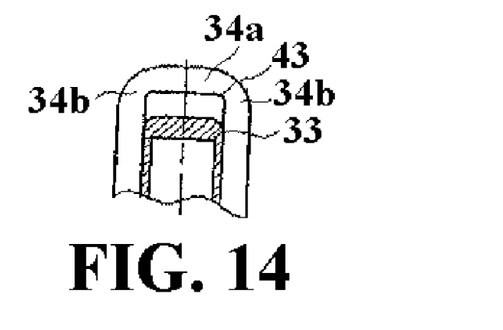
FIG. 14 is a cross sectional view in part similar to FIGS. 11, 12 and 13, but shows a fourth embodiment.

In the embodiment of FIG. 14 like the embodiment of FIG. 13 there is no slope but a recess 43 is formed on both side of the thick wall portion 34a.

Figure 15:
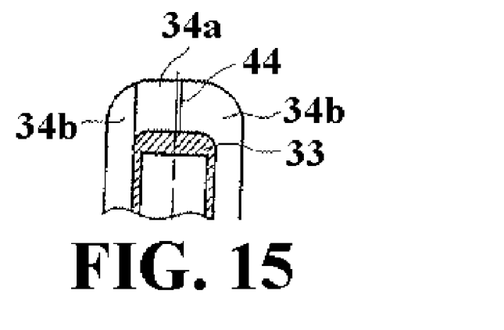
FIG. 15 is a cross sectional view in part similar to FIGS. 11, 12, 13 and 14, but shows a fifth embodiment.

In the embodiment of FIG. 15, one side of the thickened portion 34a is notched back in an axial direction as shown at 44.

Figure 5:
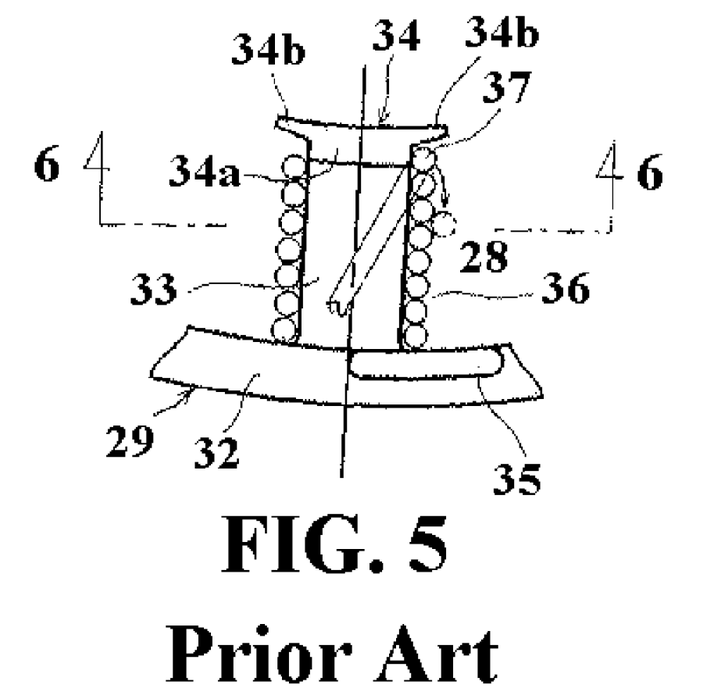
FIG. 5 is an enlarged top plan view of one of the wound armature teeth illustrating a potential problem thereof.
Figure 6:
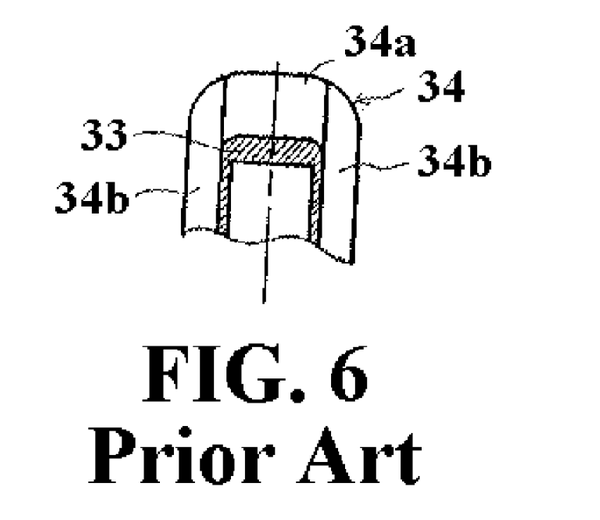
FIG. 6 is a cross sectional view taken along the line 6—6 in FIG. 5.

It should be noted that FIGS. 4 and 5 that show the problem with the prior art shows only a single coil winding, but obviously when additional coils are wound the same problem will exist. The notches or recesses described and illustrated will solve this problem even if more windings are placed on a tooth as the end coil winding will always be recessed as successive coils are wound because of the recessing of the first end winding.

Figure 16:
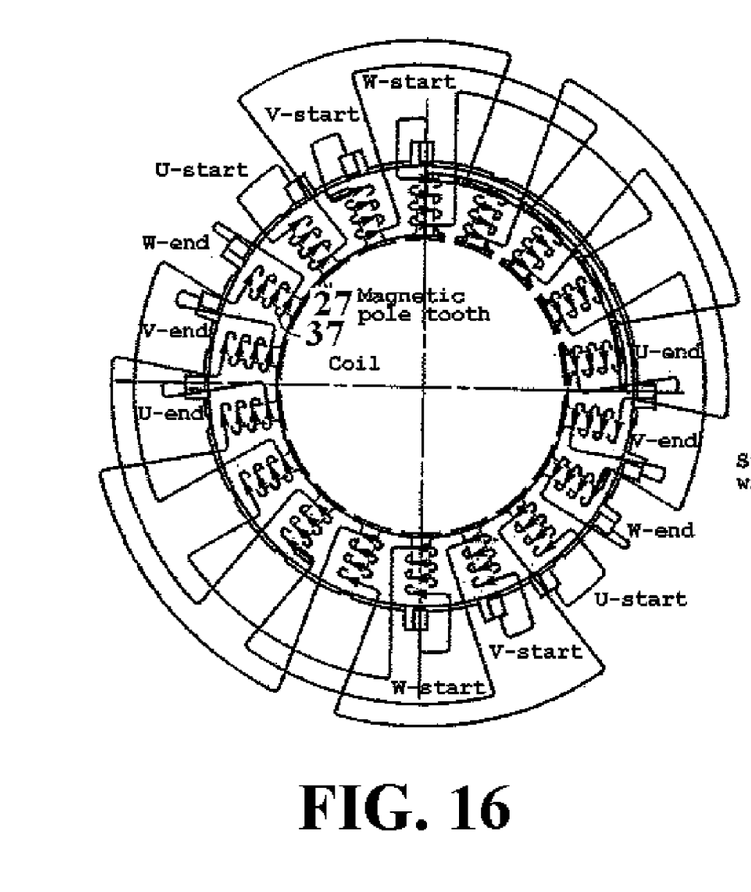
FIG. 16 is a view showing one way in which the teeth may be wound and phased.
Figure 17:
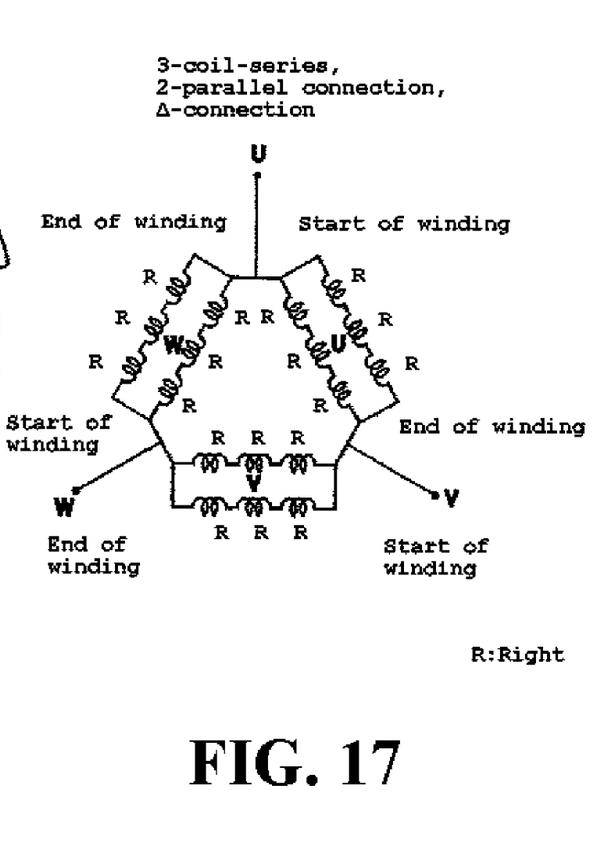
FIG. 17 is a schematic electrical diagram of the winding pattern shown in FIG. 16.

FIGS. 16 and 17 illustrates one possible coil connection of the stator of the three-phase motor of to which the present invention is applied. This example shows Δ-connection with three-coil-series, two-parallel connection in an 18-coil DC motor. Coils 35 are interconnected on three layers of pattern plates (not shown) provided in the wiring base 23. Of course those skilled in art will readily realize that other winging arrangements are possible using the invention.

Figure 18:
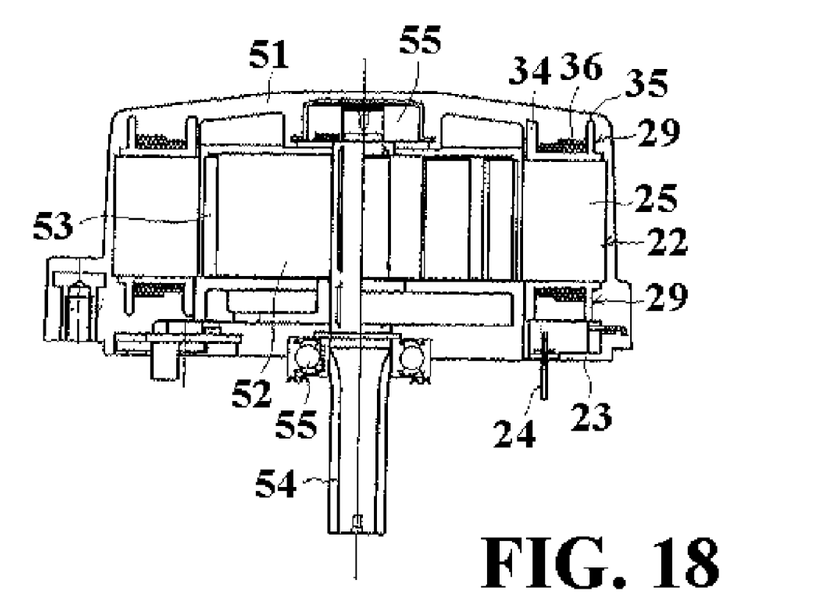
FIG. 18 is a cross sectional view of a rotating electrical machine that can utilize any of the described embodiments of the invention.
Figure 19:
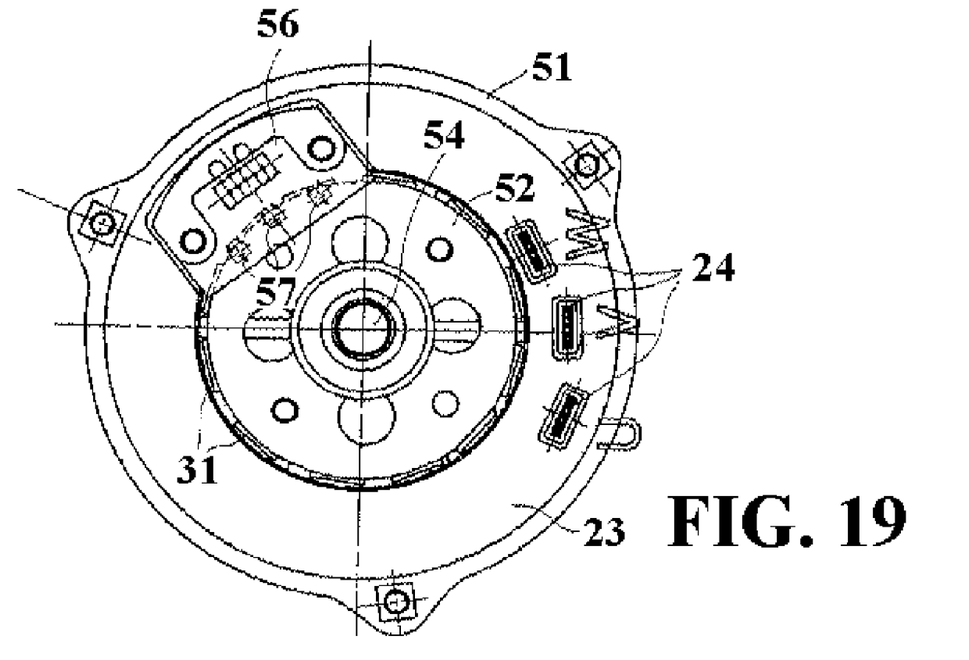
FIG. 19 is a bottom plan view of the machine shown in FIG. 18.

FIGS. 18 and 19 show how a stator armature constructed in accordance with the invention can be applied to any type of rotating electrical machine such as the illustrated three-phase blushless DC. The stator 22 is built in a motor case 51 inside of which a rotor 52 is journalled. A plurality of circumferentially spaced permanent magnets 53 are suitably mounted to the outside round surface of the rotor 52 in facing relation to the armature pole teeth. The rotor 52 is fixed to a rotor shaft 54 as an output shaft which is journalled in the motor case 51 by bearings 55. Reference numeral 56 denotes a circuit board for detecting a rotational position of the rotor 52 by means of three hall elements 23.

Thus from the foregoing description it should be obvious that the disclosed embodiments insure against coil end wire slippage when the coil ends are drawn out while maintaining the other advantages of the co-pending application. Of course those skilled in the art will readily understand that the described embodiments are only exemplary of forms that the invention may take and that various changes and modifications may be made without departing from the spirit and scope of the invention, as defined by the appended claims.

What is claimed is:

1. An insulator for an armature core of a rotating electrical machine, the core having an annular section from which a plurality of circumferentially spaced teeth extend in a radial direction and defining slots therebetween, said insulator being comprised of a cylindrical portion having a plurality of circumferentially spaced tooth covering portions extend in radial directions, each of said tooth covering portions having a generally channel shape in radial cross sections for covering a radial face of a respective of the core teeth and at least a portion of the side surfaces of the tooth facing the slots between adjacent of the teeth, the radially outermost part of each of said tooth covering portions being formed with an axially extending flange to form an abutment against which a coil winding is abuttingly engaged, said insulator being formed with a slot like recess contiguous to said axially extending flange to trap the wire of the coil winding end to prevent it from slipping along the generally channel shape portion in a radial direction.

2. An insulator as set forth in claim 1 wherein the recess is formed in the axially extending flange.

3. An insulator as set forth in claim 2 wherein the recess is tapered from the radially inner end of the flange toward its circumferential center.

4. An insulator as set forth in claim 3 wherein there are a pair of like formed recess on opposite sides of the flange.

5. An insulator as set forth in claim 2 wherein the recess is formed as a slot along the radially inner edge of the flange extending circumferentially toward the center of the flange.

6. An insulator as set forth in claim 5 wherein the slot along the full length of the flange extending circumferentially toward the center of the flange.

7. An insulator as set forth in claim 2 wherein the recess is formed by a step in the axial end of the flange.

* * * * *